United States Patent Office 3,767,686
Patented Oct. 23, 1973

3,767,686
HALOGENATED DIAMINO DIPHENYL
SULFONE DERIVATIVES
Walter T. Reichle, Millington, N.J., assignor to Union
Carbide Corporation, New York, N.Y.
No Drawing. Continuation-in-part of abandoned application Ser. No. 26,056, Apr. 6, 1970. This application
Dec. 6, 1971, Ser. No. 205,322
Int. Cl. C07c 103/12
U.S. Cl. 260—397.6
6 Claims ABSTRACT OF THE DISCLOSURE
Compounds having the structure

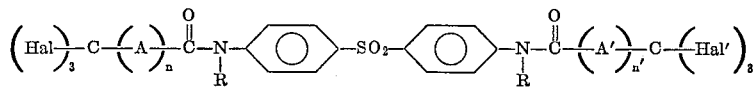

wherein
Hal and Hal' are halogen radicals,
A and A' are $C_1$ divalent hydrocarbon or perhalocarbon radicals,
R and R' are $C_1$ to $C_3$ hydrocarbon radicals, and
n and n' are 0 to 6.

These compounds are useful as initiators or activators in the anionic polymerization of lactam monomers.

This application is a continuation-in-part of patent application Ser. No. 26,056 filed Apr. 6, 1970, now abandoned.

BACKGROUND OF THE INVENTION

Field of the invention

The invention relates to novel halogenated diamide derivatives of N,N' substituted diamino diphenyl sulfones.

Description of the prior art

Certain diamino diphenyl sulfone derivatives, including certain diamides, have been prepared as disclosed in the Journal of the American Chemical Society, volume 67, pages 1979 to 1990 (1945). The thus disclosed compounds were evaluated for biological activity.

Although the $SO_2$ group which links the two phenyl radicals in this type of sulfone compound also tends to activate the entire compound for various types of chemical reactions, it has been found that the diamine compounds and the bis (acetamide) derivatives of the diamine compounds are not active enough to be used as initiators in the anionic polymerization of lactam monomers.

Attempts to use acetanilide as an initiator for the anionic polymerization of ε-caprolactam were also unsuccessful, J.M. Am. Chem. Soc., Div. of Polm. Chem., Preprints 9 (1), at page 394 (1968).

SUMMARY OF THE INVENTION

Certain halogenated diamide derivatives of N,N' substituted diamine diphenyl sulfone compounds are provided as novel compounds which are useful as initiators in the anionic polymerization of lactam monomers.

An object of the present invention is to provide for a novel class of derivatives of diamino diphenyl sulfone compounds.

A further object of the present invention is to provide compounds which may be useful as initiators or activators in the anionic polymerization of lactam monomers.

DESCRIPTION OF THE PREFERRED
EMBODIMENTS

The novel compounds of the present invention have the structure

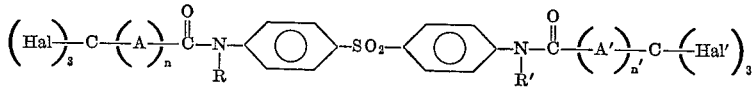

wherein
Hal and Hal' are the same or different halogen radicals, i.e., Br, Cl, F or I,
A and A' are the same or different $C_1$ divalent hydrocarbon or perhalocarbon radicals,
R and R' are the same or different $C_1$ to $C_3$, inclusive, monovalent hydrocarbon radicals, and
n and n' are the same or different whole numbers which are 0 to about 6, inclusive.

The divalent -(A)$_n$- and -(A')$_{n'}$- radicals are preferably aliphatic radicals such as alkylene radicals which would include ethylene, propylene, butylene and the like. The monovalent hydrocarbon radicals would include aliphatic radicals such as methyl, ethyl, propyl, allyl and propenyl radicals.

PREPARATION OF THE NOVEL COMPOUNDS

The novel compounds of the present invention are prepared by reacting a diamine compound having the structure

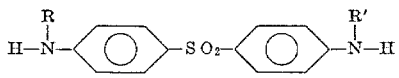

wherein R and R' are as defined above, with one or more acyl compounds having the structures

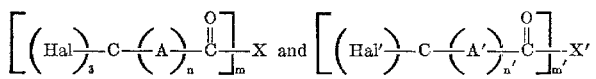

wherein Hal, Hal', A, A', n and n' are as defined above, and m and m' are the same or different whole numbers and are 1 or 2, and X and X' are the same or different and are OH or halogen radicals when m and m' are 1, and are 0 radicals when m and m' are 2, to form the desired diamide, and, when m and m' are 1, $H_2O$ or halogen acid is formed as a by-product, and when m and m' are 2 the by-product is the acid of the acyl compound.

The preferred acyl compounds for the purposes of the present invention are alkanoic acids, i.e., wherein X and X' are OH. At least 2 to about 100 moles of the alkanoic acid are used per mole of the diamine compound. The excess alkanoic acid is used as a solvent medium for the reaction. Where the acyl compound used is an alkanoic acid, the reaction is also preferably conducted in the presence of about two or more moles, per mole of the diamine, of an anhydride of the alkanoic acid being used in the reaction. The anhydride functions as a water acceptor. The use of acyl compounds having different Hal and Hal' moieties, and/or different A and A' moieties could result in the production of correspondingly different diamide derivatives. When the anhydrides act as water acceptors they are transformed into alkanoic acid materials which could, in turn, react with the diamine starting material in accordance with the above disclosed reaction process.

If the acyl compounds which are used are acylhalides, then the reaction is preferably conducted in the presence of a halogen acid acceptor such as pyridine.

The reaction is conducted at atmospheric pressure and at temperatures of about 20 to 150° C. The preferred temperature is the reflux temperature of the mixture of the components of the reaction system. The reaction should be run under an inert blanket of a moisture free gas such as nitrogen. The reaction is usually conducted for about 1 to 24 hours.

The diamide components of the present invention are crystalline materials which may be readily recovered from the reaction systems in which they are prepared by solvent removal followed by crystallization from appropriate solvents such as aqueous ethanol.

LACTAM POLYMERIZATION

The novel diamine compounds of the present invention are utilized, as noted above, in the anionic polymerization of lactam monomers to form lactam polymers. The anionic polymerization system employs an anionic catalyst and, as an initiator, one or more of the diamide compounds of the present invention. The lactams which may be polymerized according to the present invention are all those lactams which are capable of being polymerized anionically and they include compounds such as 2-pyrollidone, 2-piperidone, 6-methyl-2-piperidone, ε-caprolactam, enantholactam and the like. The catalyst which may be employed with the initiators of the present invention include all anionic catalyst materials which may be employed in the anionic polymerization of lactams. The catalyst material is usually a salt of the lactam being polymerized although any other lactam may be used to form the catalyst. The salt is usually prepared by reacting the lactam with a strong base, that is, a base strong enough to convert the lactam to its salt. Such bases would include alkali and alkaline earth metals or basic derivatives of such metals such as the hydroxides, oxides, alkoxides, phenoxides and hydrides etc. Such bases would include, therefore, metals such as lithium, sodium and potassium, and derivatives of such metals such as lithium hydroxide, sodium hydroxide, potassium hydroxide, sodium hydride, and the like. In the polymerization reactions about 0.2 to 10 moles of initiator are employed based on the moles of lactam being polymerized. About 0.2 to 20 mole-percent of catalyst is used per mole of lactam monomer being polymerized. The catalyst and initiator are employed in a mole ratio to each other of about 2 to 20.

The polymerization reaction may be conducted in bulk, at atmospheric pressure, and at a temperature of about 100 to 150° C.

The polymerization is preferably carried out under an inert blanket of gas such as nitrogen, argon or helium in order to prevent oxidative degradation of the monomer and/or destruction of the catalyst by moisture, oxygen or other catalyst poisons.

The polymers made with the initiators of the present invention may be used for a number of applications which require the use of molded articles prepared from lactam polymers such as fibers, films, engineering structures, coatings and hollow articles such as tubing and solvent tanks.

The following examples are merely illustrative of the present invention and are not intended as a limitation upon the scope thereof.

Example 1

Preparation of:

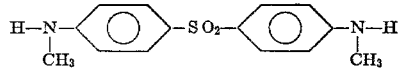

500 gm. (1.74 mole) 4,4'-dichlorodiphenylsulfone, 5.0 g. cuprous chloride and 1200 ml. 40% aqueous methylamine (14.2 mole) were heated in a 2.2 liter titanium-lined rocker bomb for 18 hours at 250° C. with agitation. After cooling, the slurry was filtered, the solids washed twice with cold water and dried (75°/vacuum); yield 472 g.; 98% of theory. The product melted at 163–173° C. Crystallization of a small sample from ethanol yielded the pure N,N'-dimethylamine, M.P. 175–177° C.

Example 2

Preparation of:

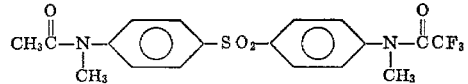

10 grams of the crude N,N'-dimethylamine prepared above as in Example 1 were refluxed in 35 ml. of trifluoroacetic acid and 15 ml. of the anhydride of this acid. The product was crystallized from ethanol, M.P. 160.0–161.5° C.

Example 3

Anionic polymerization of ε-caprolactam using N,N'-dimethyl, N'N'-trifluoroacetyl, 4,4'-diaminodiphenyl sulfone as the initiator Molten ε-caprolactam (28.3 gm., 0.25 mole) was added to two cylindrical 25 mm. x 200 mm. glass tubes (total monomer was 56.6 grams or 0.5 mole). Both tubes were heated in a 160° C. oil bath. Sodium hydride (0.48 gm., $2 \times 10^{-2}$ mole, 0.84 gm. of a 57% mineral oil dispersion, 4 mole percent based on the total monomer) was added to one tube. It quickly reacted to form a homogeneous solution of sodium ε-caprolactam in ε-caprolactam. Initiator prepared as in Example 2 was then added (1.0 gm., $2.14 \times 10^{-3}$ mole, 0.42 mole percent based on the total monomer). The polymer viscosity was higher after seven minutes. Crystallization started at eighteen minutes. The polymer was removed from the bath after ten minutes, worked up, and tested. The properties were as follows: R.V. 1.29 dl./gm., percent methanol extractables 2.86, tensile modulus 308,000 p.s.i., tensile strength 10,000 p.s.i., elongation at break 30% and pendulum impact 253 ft. lb./in.$^3$.

Example 4

Preparation of:

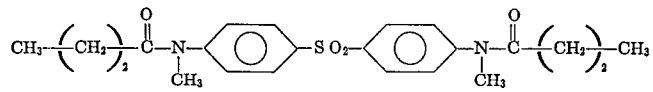

which is N,N'-dimethyl-N,N'-di(heptafluorobutyroyl)-4,4'-diamino diphenyl sulfone To 10 g. (0.036 mole) of bis(N-methyl-p-aminophenyl) sulfone was added 25.3 g. (0.6 mole) of perfluorobutyric anhydride. A mild exotherm ensued. When the exotherm subsided, the reaction mixture was heated at 180° C. for ten hours under nitrogen atmosphere. This was followed by evaporation at 180° C. (0.03 mm. Hg) for one hour. A brown, brittle solid (20.6 g., 85% of theory) was obtained which had infrared absorptions which are consistent with the structure shown.

The compound had a melting point of 57° C.

Example 5

Anionic polymerization of ε-caprolactam using N,N'-dimethyl-N,N'-di(heptafluorobutyroyl) - 4,4'-diamino diphenyl sulfone as the initiator.

Solutions of 0.34 g. of sodium hydride (57% dispersion) in 11.3 g. of ε-caprolactam and 1.34 g. of the initiator in 11.3 g. of ε-caprolactam were heated separately in an oil bath maintained at 160° C. When the temperature of each solution reached 160° C. they were mixed together. The final solution had an initiator concentration of 1 mole percent and a catalyst concentration (sodium caprolactam) of 4 mole percent. The polymerization was observed for its no-flow time and crystallization time.

The no-flow time was 110 seconds and the time needed to achieve crystallization of the resulting nylon-6 polymer was 120 seconds. The resulting nylon-6 resin was a molding grade material.

What is claimed is:

1. A compound of the structure

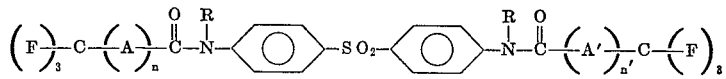

wherein

A and A' are methylene or difluoromethylene,

R and R' are lower alkyl or lower alkenyl radicals, having from 1 to 3 carbon atoms, n and n' are whole numbers from 0 to 6.

2. A compound as in claim 1 in which A and A' are difluoromethylene.

3. A compound as in claim 2 in which n and n' are 0.

4. A compound as in claim 3 which is N,N'-dimethyl-N,N'-di(trifluoroacetyl)-4,4'-diamino diphenyl sulfone.

5. A compound as in claim 2 in which n and n' are 2.

6. A compound as in claim 5 which is N,N'-dimethyl-N,N'-di(heptafluorobutyroyl) - 4,4'-diamino diphenyl sulfone.

References Cited

UNITED STATES PATENTS 2,333,394   11/1943   Shonle et al. _____ 260—397.6

HENRY R. JILES, Primary Examiner

S. D. WINTERS, Assistant Examiner

U.S. Cl. X.R.

260—78 L